UNITED STATES PATENT OFFICE 1,960,252

BASE FOR COATING, CEMENTING, MOLDING, AND THE LIKE COMPOSITIONS

John Mano, Flushing, N. Y., assignor to Hosnoler Corporation, New York, N. Y., a corporation of New York No Drawing. Application January 6, 1930, Serial No. 418,994

15 Claims. (Cl. 106—23)

This invention relates to bases for various types of coating and other compositions such as varnish, paint and particularly, anti-fouling paint compositions, cement compositions, sealing compounds, covering compositions in the form of sheets, molding compositions, and the like, as will be more fully pointed out hereinafter.

My invention contemplates the provision of such a base as is comparatively elastic, water-proof, anti-corrosive, acid-fume resisting, and anti-fouling, and which when mixed with other materials, can be spread out as a paint or protective coating, or formed into sheets for flooring, wall or roof coverings, which can be used as a water-proof cement or sealing compound, or in electrical insulation compounds, or which can be molded to produce various molded articles.

In carrying out my invention, I prefer to use an intimate mixture of certain ingredients including certain gums, and resins extracted from such gums. To the gums and resins may be added a great variety of inert and/or other materials depending upon the use to which the final product is to be put. The ingredients may be subjected to various processes, as will be more fully explained hereinafter, to attain the desired intimate mixture.

I have found that a certain gum is especially fitted for use in my base, since it contains resins and a coagulation product in the nature of rubber in the proper proportions and properly associated for my purpose. I prefer to use this gum as one of the principle ingredients of my new base because of its peculiar nature, but it will be understood that its effective ingredients may be extracted from or found in a large number of other gums and resins which may be added to or substituted for the preferred gum. The gum to which I refer has been heretofore unknown and has been named "Lincman" gum.

Lincman gum is a coined name for *Euphorbia lactea*, or the milky exudate of the plant native to Santo Domingo and identified by the specialists of the United States Department of Agriculture, Bureau of Plant Industry, early in the year 1929, as *Euphorbia lactea*, and is called by the natives, "Raquetta", and is also known as *Euphorbia antiquorum*. It is identified and described by Nathaniel Lord Britton in his work entitled "Flora of Bermuda", published by Charles Scribner & Sons, New York, in 1918, on page 219, as follows: "*Euphorbia lactea haw*; mottled candlestick tree, East Indian, a fleshy nearly leafless plant 6'–12' high, the spreading 3-angled branches whitish or yellowish-blotched, knobby, with a short double spine on the end of each knob, is grown for interest in many gardens. Its copious sap is bright white". The exudate from this cactus plant is freed from foreign material and coagulated.

The resulting product is a slightly grayish, firm, putty-like though tough mass. It is insoluble in water, partly soluble in alcohol, acetone, and ether. It is entirely soluble in benzol and its homologues, carbon tetrachloride, chloroform, carbon disulphide, or mixtures thereof.

I have found that after the gum had been allowed to stand for some length of time in alcohol, and the insoluble portion then removed by filtration, after which the alcohol is evaporated, it yielded, when dried, a transparent, glossy, smooth to the touch, faintly brownish residuum of amorphous nature which can be scaled and powdered and in the nature of a resin. This extracted resin contains substances extremely bitter to the tongue, lips and throat, giving when tasted, an increasing sense of warmth. It is peppery, burning and smarting to the taste, much similar to capsicum. The sensation lasts for several hours, from which I conclude that the gum contains a substantial proportion of bitter principles.

It is probably for that reason that cattle do not eat it and that it is used by the natives as a hedge for fencing out goats, hogs and cattle. Lincman gum further contains, besides resin and bitter principles, a substantial amount of a colloid in the nature of rubber.

While, therefore, as has been stated, I prefer to use Lincman gum because of its rubber-like and resin composition, it is to be understood that any lactiferous plant exudate, whether in coagulated form or in the form of latex, in combination with resinous substances or substances capable of oxidation into resinous substances, may be used in place thereof. By lactiferous plant exudates, I mean substances in the general nature of rubber or its congeners which may be derived from a great variety of plants such as trees, shrubs and vines, found or grown principally in tropical regions. The plants from which such exudates are obtainable are very large in number, many having been classified but many being still commercially and botanically unknown. Said plants, however, have the common property of yielding a colloid designated by the general term "rubber" which is intended to include gutta percha, caoutchouc, balata, guayule, euphorbia, chicle, and any of their congeners. A resin extracted from the group consisting of the rubber plants referred to together with coagulated or uncoagulated latex from this group would serve the purpose of the preferred Lincman gum.

To fully utilize the properties of the Lincman gum, I prefer to mix it with certain other gums known as Mariola gum, elastica gum, and a euphorbia gum such as euphorbium coagulum, though it will be understood that the latter gums contain many of the valuable ingredients of the Lincman gum, and may be substituted therefor in the proper proportions, if desired, and that any of the congeners of said latter gums may be used instead, if desired.

The substance known as Mariola gum consists of the resins extracted from rubber. It will be understood that hereinafter, where the term "Mariola gum" is used, I intend this term to apply to any resins or gum resins extracted from rubber, euphorbia, elastica, gutta percha, caoutchouc, balata, or any of their congeners. To replace the Mariola gum, however, I have found that any type of resin such as is suitable for use in varnish and paint bases, may be used, whether a true resin, an oil resin, or a drying oil, which when oxidized, acts substantially in the same manner as a resin.

For example, I may use any of the resins obtained from living trees such as colophony, sandarac, dammars, mastic, or the like, or the so-called hard resins such as fossil resins, copal resins or varnish gums, or synthetic resins such as phenolic resins, or coal tar resins such as coumarone or indene resins, or even certain other varnish or paint bases in the form of vegetable drying oils such as China wood oil, linseed oil and the like, whether oxidized or not, or the resins extracted from various plant exudates.

Elastica gum is a rubber gum and any type of rubber gum selected from the group named above may be used instead. Euphorbia is also a rubber and any of its congenerous may also be used. For example, I have found that euphorbium coagulum, which is an African product for which no commercial use has heretofore been found, may well be used in my new base as one of the ingredients and particularly, the ingredient containing rubber.

To obtain the desired intimate mixture of the various ingredients, equal parts of the Mariola gum or its equivalent, the Lincman gum or its equivalent or substitute, the elastica gum or its equivalent, and the euphorbia or its equivalent, are all powdered so as to pass through a 100-mesh screen. The powdered materials are slightly moistened with a small amount of "drip oil".

Drip oil is a hydrocarbon condensation product obtained during the manufacture of illuminating gas, condensing from said gas or coming off therefrom as an oily distillate which is sometimes called "gas house liquor", "gas oil", "coal tar oil", or "solvent naphtha". It contains the waste products resulting from illuminating gas manufacture, such as various hydrocarbons including benzol, naphthalene, aniline, and derivatives or homologues thereof. The sulphur compounds are preferably extracted therefrom by means of lime and alum and in this condition, it has a less offensive odor.

In order to remove from the mixed and moistened ingredients, the sand, dirt, ash, carbon, vegetable matter and other foreign substances, the mixture is heated sufficiently to drive off the excess moisture. Heating the mixture causes it to fuse, the melt having first a light brown color but as it is stirred, it becomes darker and then black. It finally has a pitch black, glossy appearance. Heating is continued only until no solid particles remain and the mixture is in a completely molten state, after which it is poured off and thereby separated from the impurities. The base thus obtained may be marketed in lumps of various size or it may be powdered and marketed in powdered form, or if desired, it may be dissolved in a suitable solvent. To obtain a still more intimate mixture, the melt, after being purified, may be allowed to solidify and then powdered, and a suitable solvent added thereto. If desired, the solvent may be added carefully before the melt has solidified, but I have found that cooling and powdering before the addition of the solvent produces a more intimate mixture and gives somewhat better results.

I prefer to use carbon tetrachloride or drip oil as solvents, or a combination of one part of drip oil to three parts of carbon tetrachloride. The carbon tetrachloride being a comparatively expensive ingredient, the mixture thereof with drip oil lessens the cost while at the same time, the offensive odor of the drip oil is substantially neutralized. If a non-inflammable paint is desired, the carbon tetrachloride alone is used. If, however, it is desired to mold the composition, then only a sufficient amount of the solvent is added to reduce the composition to a pasty consistency. The carbon tetrachloride and the drip oil may be replaced or used in connection with a great variety of other solvents such as carbon disulphide, chloroform, benzol and its homologues, aliphatic hydrocarbons and their derivatives, and aromatic hydrocarbons and their derivatives.

My new base may be used in connection with a large variety of other materials to form many different products. For example, 15 to 35% by weight of lanolin may be added to the base in powdered form or to the base dissolved in the solvent to form an anti-fouling and anti-corrosive water-proof paint or water-proof cement or sealing compound. Such a paint or cement is particularly adapted for use under ground for coating pipes or exposed metallic surfaces, or for under-seal construction or construction subjected to the action of sea water such as bulkheads, piers, docks, piles, buoys, lighthouses, and the like. It is also useful and efficient inside and outside of cellars and concrete work set in the ground. It may also be used for joining terra-cotta blocks set in the ground, or for protecting telephone and telegraph cables. It may also be used in connection with a toxic for an anti-fouling paint or without the toxic, on surfaces where moisture is present or where moisture has a tendency to condense, such as in ships, cellars, submarines and below ground level construction.

It has further uses in connection with the coating of surfaces subject to the attack of acid fumes such as in chemical plants or to protect the surfaces against the action of chlorine as in water purification or insect destruction plants. It may be used as a cement for cementing linoleum, rubber, and floor coverings of similar nature, under hydrostatic or hydroscopic conditions as for example, cementing floor coverings directly to the ground or below ground level in shops and moist places.

For insulating purposes, the base may be mixed with infusorial earth, cotton, asbestos, and similar insulating materials or it may be used in the manufacture of linoleum when mixed with ground cork or similar products.

For use as a molding material, particularly, where water-proof properties are desirable, it may be mixed with silicious materials or earths, iron filings, Portland cement, clay, kaolin, talc, steatite, Delaware clay, sand, glass, kieselguhr, fluorspar, or with argillaceous materials or with pigment fillers such as lithopone, lead, zinc, calcium, chromium, aluminum or other metal oxides, or with other fibrous cellulose material such as cocoa-nut shells, ivory nuts, red wood bark, wood fibre and the like, or with any inert, powdered and fairly hard material.

For the manufacture of wall board and ceiling board, it may be mixed with suitable fibrous fillers such as bark, wood fibre, or the like. For shingles and roofing compositions, it may be used for the coating or impregnation of roofing paper or roofing felt and when mixed with pigment fillers such as those hereinbefore mentioned, it resists the attack of salt sea air and does not change color or crack.

It will be understood that in all cases where the base is to be used for water-proofing or water-resisting purposes, it should be used in connection with lanolin.

It will be seen that I have provided a base suitable for use in connection with paints, cements, coverings, molded articles and the like, when mixed with other ingredients, as may be desired, and that while I have described certain ingredients in detail as preferable, the ingredients and the proportions thereof may be greatly varied and I therefore do not intend to be understood as limiting myself to the specific ingredients mentioned but intend to claim my invention as broadly as may be permitted by the state of the prior art and the terms of the appended claims.

I claim:

1. A base for the manufacture of paints, cements, sealing compounds, sheet coverings and molding compositions, comprising an intimate fused mixture of the gum obtained from the euphorbia lactea, a rubber resin, and a rubber gum.

2. As a new composition of matter, an intimate mixture of the gum obtained from the euphorbia lactea, and rubber.

3. As a new composition of matter, an intimate fused mixture of the gum obtained from the euphorbia lactea, a resin, and at least one lactiferous plant exudate in the nature of rubber.

4. As a new composition of matter, an intimate mixture comprising the lactiferous plant exudates of at least two different plants selected from the euphorbia family and its congeners, and a resin obtained from rubber, said composition being adapted to be mixed with lanolin for use on moist surfaces.

5. A base for a coating, sealing, or molding composition comprising Lincman gum, and a resin.

6. A base for a coating, sealing, cementing or molding composition including Lincman gum, a resin and a rubber gum.

7. A base for a coating, sealing, cementing or molding composition, comprising Lincman gum, two different gums other than the Lincman gum and selected from the euphorbia family and its congeners, and a resin obtained from rubber.

8. A composition including Lincman gum, a resin, and a filler.

9. A composition usable as a paint or cement in the presence of moisture including Lincman gum, a rubber resin and lanolin.

10. A composition comprising Lincman gum, a resin and lanolin.

11. A composition comprising Lincman gum and lanolin.

12. A composition including Lincman gum, a pigment and lanolin.

13. A composition including Lincman gum, gums selected from a group containing the euphorbia, gutta percha, caoutchouc, balata and chicle families and their congeners, a resin, a pigment and lanolin.

14. A composition including Lincman gum, a resin, and a paint pigment selected from a group consisting of lithopone, lead, zinc, calcium, chromium, aluminum and other suitable metal oxides, and inert, powdered and fairly hard materials such as fibrous cellulose material.

15. A base for a coating, sealing, cementing or molding composition, comprising equal parts of Mariola gum, Lincman gum, Elastica gum, and a Euphorbia gum intimately mixed.

JOHN MANO.